UNITED STATES PATENT OFFICE.

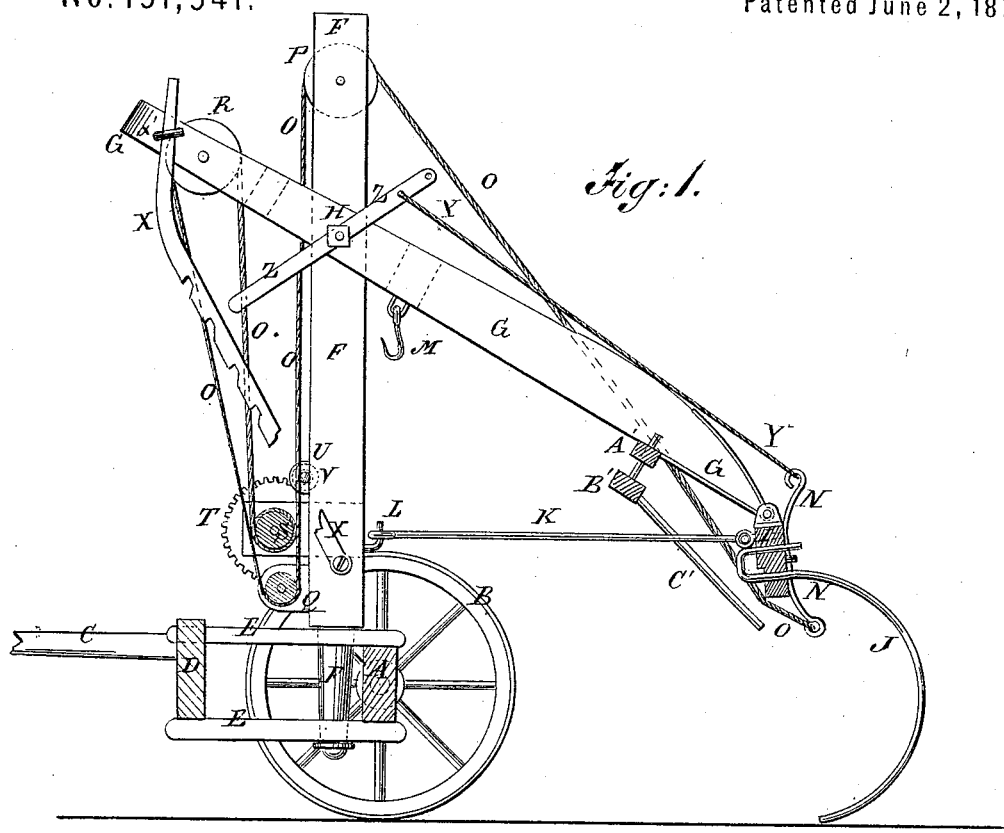
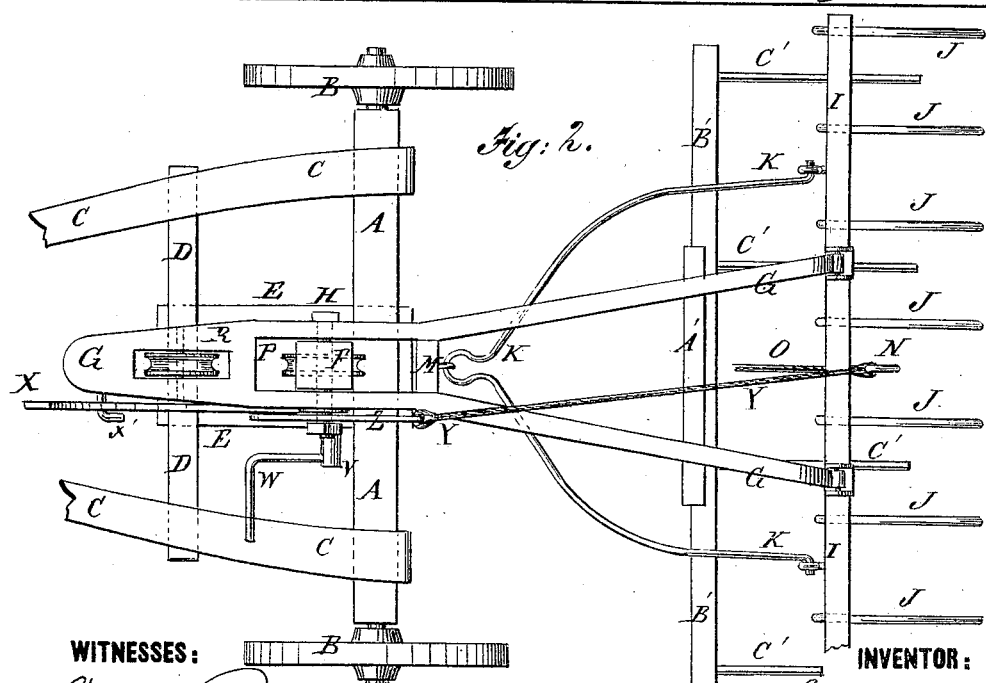

GEORGE W. KIDWELL, OF ELWOOD, INDIANA.

IMPROVEMENT IN HAY-LOADERS.

Specification forming part of Letters Patent No. 151,541, dated June 2, 1874; application filed March 28, 1874.

*To all whom it may concern:*

Be it known that I, GEORGE W. KIDWELL, of Elwood, in the county of Madison and State of Indiana, have invented a new and useful Improvement in Hay Rake and Loader, of which the following is a specification:

Figure 1 is a side view of my improved machine, partly in section to show the construction. Fig. 2 is a top view of the same.

Similar letters of reference indicate corresponding parts.

My invention has for its object to furnish an improved machine for collecting hay and loading it upon a wagon, which shall be simple in construction, convenient in use, and effective in operation, and which may also be used for collecting hay into windrows with the same facility as an ordinary rake. The invention consists in the combination of the carriage, the swiveled post, the pivoted lever, and the hinged rake-head with each other; in the combination of the bail and the two hooks with the rake-head, the pivoted lever, and the swiveled post; in the combination of the lever, the rope, the guide-pulleys, the shafts, the gear-wheels, and the crank with the rake-head, the swiveled post, and the pivoted lever.

A is an axle, which is made long and strong, and upon the journals of which revolve small wheels B. To the axle A, near its ends, are attached the ends of the shafts C, which are made strong, and are connected a little in front of the axle A by a strong cross-bar, D. To the upper and lower sides of the middle part of the axle A are secured the rear ends of the planks E, the forward ends of which are attached to the cross-bar D. In the two plates or planks E is formed a round hole to receive and serve as a bearing for the round tenon formed upon the lower end of the post F. G is a lever, the forward part of which is slotted to receive the upper part of the post F, to which it is pivoted by a strong bolt, H, which passes through the said post and lever. The rear part of the lever G is branched, and to the rear ends of its branches is hinged the shaft or bar I, to which are attached the curved rake-teeth J, in the usual way. To the forward side of the rake-head I are pivoted the ends of the bail K, which has an eye formed upon its center, to be hooked upon the hook L, attached to the lower part of the rear side of the post F, to sustain the draft when collecting the hay. When loading the hay upon the wagon the bail K is unhooked from the hook L, and hooked upon a hook, M, attached to the lower side of the lever G. To the rear side of the center of the rake-head I is attached a lever, N, at right angles with said head I. To the lower end of the lever N is attached a rope, O, which passes over a pulley, P, pivoted in a slot in the upper end of the post F, passes down along the forward side of the post F, around a pulley, Q, pivoted to the lower part of said post F, passes up to and around a pulley, R, pivoted in a slot in the forward end of the lever G, passes down, and its end is attached to the shaft S, which works in bearings attached to the lower part of the post F. To one end of the shaft S is attached a large gear-wheel, T, the teeth of which mesh into the teeth of a small gear-wheel, U, attached to the end of the shaft V, which works in bearings attached to the lower part of the post F, and to the other end of which is attached a crank, W. By this arrangement, by turning the crank W, and winding the rope O upon the shaft S, the forward end of the lever G will be drawn down, raising its rear end and the loaded fork attached to it. When the rope O begins to wind upon the shaft S the first effect is to draw the points of the rake-teeth J forward and upward, so that the hay cannot drop from the rake while being raised. When the loaded fork has been raised to the proper height the post F is turned to bring the loaded fork over the wagon at the side of the machine, upon which the hay is dropped. To the side of the lower part of the post F is pivoted the lower end of the curved bar X, which has notches formed in its forward edge, to catch upon a keeper, X', attached to the forward end of lever G, and through which the said bar X passes to hold the loaded fork in any position into which it may be raised while the post F is being turned to bring it over the wagon. To the upper end of the lever N is attached the end of the rope Y, the other end of which is attached to the end of the lever Z, pivoted to the side of the lever G, so that, by operating the said lever Z, the rake I J may be turned to discharge the hay. To the lower side of the branched rear part of the lever G is attached a cross-bar, A', to which is secured, by long pins or bolts, a cross-bar, B', to which is attached a number of rearwardly-projecting fingers C', which pass between the teeth J, of the rake I J, to push the hay off said teeth J as the rake-head is turned to discharge the collected hay.

The device B' C' is only used when the hay is to be collected into windrows, and is detached when the hay is to be loaded upon a wagon.

Having thus described my invention, I claim as new and desire to secure by Letters Patent—

1. The combination of the carriage A B C D E, the swiveled post F, the pivoted lever G, and the hinged rake-head I J with each other, substantially as herein shown and described.

2. The combination of the bail K and hooks L and M with the rake-head I J, the swiveled post F, and the pivoted lever G, substantially as herein shown and described.

3. The combination of the lever N, the rope O, the guide-pulleys P Q R, the shafts S V, gear-wheels T U, and crank W with the rake-head I J, the swiveled post F, and the pivoted lever G, substantially as herein shown and described.

GEORGE W. KIDWELL.

Witnesses:
JOSEPH A. STEPHENSON,
JAMES H. DEHORITY.